US007221367B2

(12) United States Patent
Cardno

(10) Patent No.: US 7,221,367 B2
(45) Date of Patent: May 22, 2007

(54) QUEUE MANAGEMENT SYSTEM AND METHOD

(75) Inventor: Andrew John Cardno, Wellington (NZ)

(73) Assignee: Compudigm International Limited, Wellington (NZ)

( * ) Notice: Subject to any disclaimer, the term of this patent is extended or adjusted under 35 U.S.C. 154(b) by 421 days.

(21) Appl. No.: 10/444,496

(22) Filed: May 23, 2003

(65) Prior Publication Data

US 2004/0036712 A1      Feb. 26, 2004

Related U.S. Application Data

(63) Continuation of application No. PCT/NZ01/00263, filed on Nov. 26, 2001.

(30) Foreign Application Priority Data

Nov. 24, 2000   (NZ)   ..................... 508429

(51) Int. Cl.
    *G06T 11/20*   (2006.01)
    *H04N 7/18*   (2006.01)
(52) U.S. Cl. .................. 345/440; 348/143; 348/150
(58) Field of Classification Search ............... 345/440; 348/143, 150, 159
See application file for complete search history.

(56) References Cited

U.S. PATENT DOCUMENTS 5,097,328 A * 3/1992 Boyette ................ 348/150
5,581,625 A * 12/1996 Connell ................ 382/100
5,656,801 A * 8/1997 Goren et al. ............ 235/98 R
5,864,616 A * 1/1999 Hartmeier ............ 379/265.03
5,953,055 A    9/1999 Huang et al.
6,185,314 B1 * 2/2001 Crabtree et al. ........... 382/103
2004/0052381 A1 * 3/2004 Hoetzel ................ 381/56

FOREIGN PATENT DOCUMENTS

| WO | WO 00/77682 | 2/2000 |
| WO | WO 01/04808 | 1/2001 |
| WO | WO 02/10979 | 2/2002 |

* cited by examiner

*Primary Examiner*—Kee M. Tung
*Assistant Examiner*—Michelle K. Lay
(74) *Attorney, Agent, or Firm*—Dorsey & Whitney LLP

(57) ABSTRACT

The invention provides a data visualisation system comprising a data value memory in which is maintained a finite set of data values obtained from monitoring apparatus and a display configured to display a representation of each data value centered on respective data points. The invention also provides a contour generator which in one form is configured to generate and display a contoured representation around each data point such that each data point is displayed as a local maximum and in another form is configured to generate and display one or more contour lines around each data point, each contour line representing data values which are less than the data value of the data point around which the contour line is displayed. The invention also provides related methods and computer programs.

12 Claims, 4 Drawing Sheets

QUEUE MANAGEMENT SYSTEM AND METHOD

CROSS-REFERENCE TO RELATED APPLICATION(S)

This application is a continuation of International Application Number PCT/NZ01/00263, filed on Nov. 26, 2001, which claims priority to New Zealand Application No. 508429, filed on Nov. 24, 2000, the contents of both applications are incorporated herein by reference.

FIELD OF INVENTION

The invention relates to a data visualisation system and method, particularly but not solely designed for use in assessing and analysing human activity such as queues of people, crowds attending an event, foot traffic through a space, individuals loitering in an area, and so forth.

BACKGROUND TO INVENTION

The low cost of data storage hardware has led to the collection of large volumes of data. Merchants, for example, generate and collect large volumes of data during the course of their business. To compete effectively, it is necessary for a merchant to be able to identify and use information hidden in the collected data. Where the merchant operates retail premises, this data could include operational parameters such as the length of customer queues, the average waiting time in a queue, the average service time and so forth. The data could also include information on the areas in which customers prefer to browse within a retail premises. The task of identifying this hidden information has proved very difficult for merchants.

U.S. Pat. No. 5,097,328 to Boyette describes a system which performs image processing of camera images. The system is designed for use in businesses which include queues or servers and has a camera which captures successive images of an area to be monitored. A combination of blob analysis and motion analysis is used to determine if a server is on duty and present at the server's station, and if the server is serving a customer. Using blob analysis techniques, the system is able to maintain a count of the number of people waiting in the queue to be served. The data is used to generate displays directing waiting customers to the next available server and to inform newly arriving customers of their expected waiting time.

U.S. Pat. No. 5,953,055 to Huang et al/NCR Corporation describes a system for detecting, collecting information about, and analysing a queue. A sequence of video images from a video camera are converted into digital video images and pixel processing and edge detection are performed, regions separated by less than a defined pixel distance are grouped into single objects, and the number of objects are counted to determine the number of persons in an area, for example a queue. The system can collect data on the number of people in the queue, the average service time for each person in the queue, and other types of information regarding the queue.

U.S. Pat. No. 5,864,616 to Hartmeier/Intel Corporation describes a system which collects data on call activity, for example the number of calls waiting in a queue, the time duration of the oldest call still in the queue, and a site identifier. The system displays these statistics to a user in a display which uses features such as colour to indicate the current state of calls waiting to be served and the longest call waiting.

The systems described above are largely focused on the capture and storage of data representing human activity. None of these systems provide a means of display of the captured and stored data in a form which is intuitive and easy to interpret.

SUMMARY OF INVENTION

In one form the invention comprises a data visualisation system comprising a data value memory in which is maintained a finite set of data values obtained from monitoring apparatus; a display configured to display a representation of each data value centred on respective data points; and a contour generator configured to generate and display a contoured representation around each data point such that each data point is displayed as a local maximum.

In another form the invention comprises a data visualisation system comprising a data value memory in which is maintained a finite set of data values obtained from monitoring apparatus; a display configured to display a representation of each data value centred on respective data points; and a contour generator configured to generate and display one or more contour lines around each data point, each contour line representing data values which are less than the data value of the data point around which the contour line is displayed.

In a further form the invention comprises a data visualisation system comprising a data value memory in which is maintained an interaction database of interaction data representing interactions between customers and merchants, the interaction data obtained from monitoring apparatus; a retrieval device configured to retrieve from the interaction database data representing interactions between customers and merchants and to construct a finite set of data values from the retrieved data; and a display configured to display a graphical representation of at least one merchant and to superimpose one or more contoured representations of the data values on the graphical representation of the merchant such that each data value is displayed as a local maximum.

In another form the invention comprises a method of data visualisation comprising the steps of maintaining in a data value memory a finite set of data values obtained from monitoring apparatus; displaying a representation of each data value centred on respective data points; and generating and displaying a contoured representation around each data point such that each data point is displayed as a local maximum.

The invention in a further form comprises a method of data visualisation comprising the steps of maintaining in a data value memory a finite set of data values obtained from monitoring apparatus; displaying a representation of each data value centred on respective data points; and generating and displaying one or more contour lines around each data point, each contour line representing data values which are less than the data value of the data point around which the contour line is displayed.

In a further form the invention comprises a method of data visualisation comprising the steps of maintaining in a memory an interaction database of interaction data representing interactions between customers and merchants, the interaction data obtained from monitoring apparatus; retrieving from the interaction database data representing interactions between customers and merchants; constructing a finite set of data values from the retrieved data; displaying a graphical representation of at least one merchant; and superimposing a contoured representation of the data values on the graphical representation of the merchant such that each data value is displayed as a local maximum.

BRIEF DESCRIPTION OF THE FIGURES

Preferred forms of the data visualisation system and method will now be described with reference to the accompanying Figures in which.

DETAILED DESCRIPTION OF PREFERRED FORMS

Figure 1:
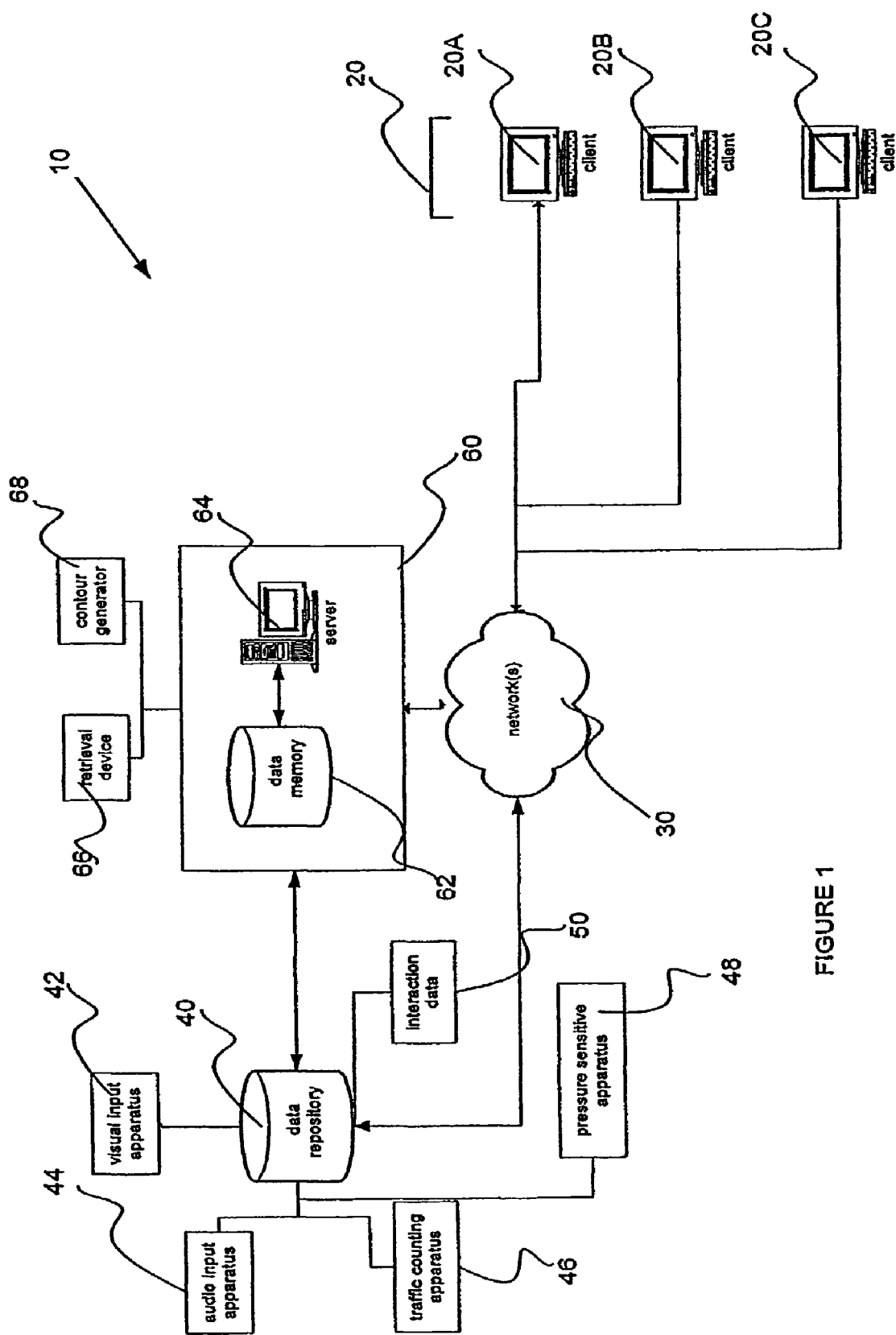
FIG. 1 shows a block diagram of a system in which one form of the invention may be implemented.

FIG. 1 illustrates a block diagram of the preferred system 10 in which one form of the present invention may be implemented. The system includes one or more clients 20, for example 20A, 20B and 20C, which each may comprise a personal computer or workstation described below. Each client 20 is connected to a network or networks 30 as shown. It is envisaged that network(s) 30 could comprise a local area network or LAN, a wide area network or WAN, an Internet, Intranet, wireless access network, or any combination of the foregoing.

The preferred system 10 further comprises a data repository 40, for example a data warehouse maintained in a memory. It is envisaged that the data repository may alternatively comprise a single database, a collection of databases, or a data mart. The preferred data repository 40 includes data from a variety of sources. The data repository may include, for example, data obtained from monitoring apparatus for example visual input apparatus 42, audio input apparatus 44, traffic counting apparatus 46, pressure sensitive apparatus 48 and/or interaction data 50 representing interactions between customers and merchants which in one form could comprise interactions between customers and merchants over a telecommunications network for example a public switched telephone network or PSTN or other communications network.

One preferred form of the invention comprises a personal computer or workstation 60 operating under the control of appropriate operating and application software having a data memory 62 interfaced to a server 64, the workstation interfaced to the network(s) 30. The invention could include a retrieval device or component 66 which in one form comprises a software-implemented query enabling retrieval of data from the data repository 40. The data retrieved using the retrieval device 66 is processed with the server 64. A contour generator 68 which in one form comprises a computer-implemented software program generates a contoured representation or series of contour lines in order to display a representation of the data on a client workstation 20 as will be described below.

The invention in one form comprises the workstation 60 which is arranged to retrieve data from the data repository 40, to process the data with the server 64 and to display the data on a client 20 as will be described below. It is envisaged that the raw or processed data could be stored in the data memory 62.

In another form the invention comprises a software product either installed or operating on workstation 60 or arranged to be installed and operated on the workstation.

The invention in another form comprises a method of retrieving the data from the data repository 40, processing the data and displaying the data on a client 20 using the workstation 60.

As described above, the system 10 could include visual input apparatus 42. Examples of such visual input apparatus include video cameras, electronic eyes, infrared cameras, motion detectors and light beam sensors. Generally a predefined monitored area will be selected for the monitoring of human activity within that selected area. Such activity could include a queue of people standing in a line or cluster waiting for some service or product. The human activity could also include a crowd attending an event, or could include one or more individuals loitering in a predefined monitored area. Video cameras and other visual input apparatus could be directed toward the monitored area in order to capture data representing human activity within that area.

For example, a merchant may operate a commercial premises and wish to monitor the behaviour of customers within the merchant premises. By positioning one or more video cameras at strategic locations within the merchant premises, the merchant can obtain information about customers in the commercial premises. The merchant could position a video camera to capture images of customers waiting in line to be served. By performing image processing on successive captured image frames, various parameters of customer behaviour can be obtained. For example, the length of the queue, the average waiting time in the queue, the average service time and the queue falloff can all be estimated simply by image processing on successive frames captured by a video camera directed at a customer queue. Such parameters are referred to as key performance indicators or KPIs.

By positioning several video cameras around a merchant premises, the merchant can also perform further processing on image frames from these further video cameras to obtain information on the number of customers travelling through different areas or locations in the merchant premises and the length of time that each customer spends at these different locations.

By using the same video cameras, the merchant can obtain data on the unauthorised entry of individuals on the merchant premises outside of usual trading hours. The point of entry can be readily ascertained, and those parts of the monitored area in which the unauthorised person or persons travel can also be readily ascertained.

In addition to or as an alternative to visual input apparatus 42, the system 10 could also include data captured by audio input apparatus 44. Such audio input apparatus could include one or more microphones for recording audio inputs within a monitored area. Such audio inputs have an advantage over visual input apparatus in that they are more readily concealed by a merchant. Inputs from microphones can be analysed and stored in the data repository 40 as audio files or equivalent to locate the presence of one or more persons within the monitored area and can also give an indication of the number of persons and the state of agitation or general mood by the volume of noise.

The system 10 could also include inputs from traffic counting apparatus 46 such as turnstiles or ticketing machines and the data stored in the data repository 40 from the traffic counting apparatus 46 could include the number of individuals through a monitored area within a given time frame.

The system 10 could also include inputs from pressure-sensitive apparatus 48 for example floor-mounted sensor pads. Data captured from the pressure-sensitive apparatus 48 is stored in the data repository 40 and gives an indication within a monitored area where individuals travel and how long individuals spend in the areas monitored by the sensor pads.

The system 10 could also include interaction data 50, for example queue statistics of callers put on hold in a telecommunications network for example a public switched telephone network or PSTN or other communications network, or a queue of applicants for an Internet service.

The data repository 40 could comprise data values obtained from any one or more of the above methods. In this way, some of the data values could be obtained from one method whereas other data values could be obtained from another method. In each case, the data values stored in the data repository 40 could include time and/or date values. The invention is arranged to retrieve these data values from the data repository 40 and to display either animated visual images or still images on the client 20 in a form which can be easily interpreted and which can be archived for analysis at a later date.

Figure 2:
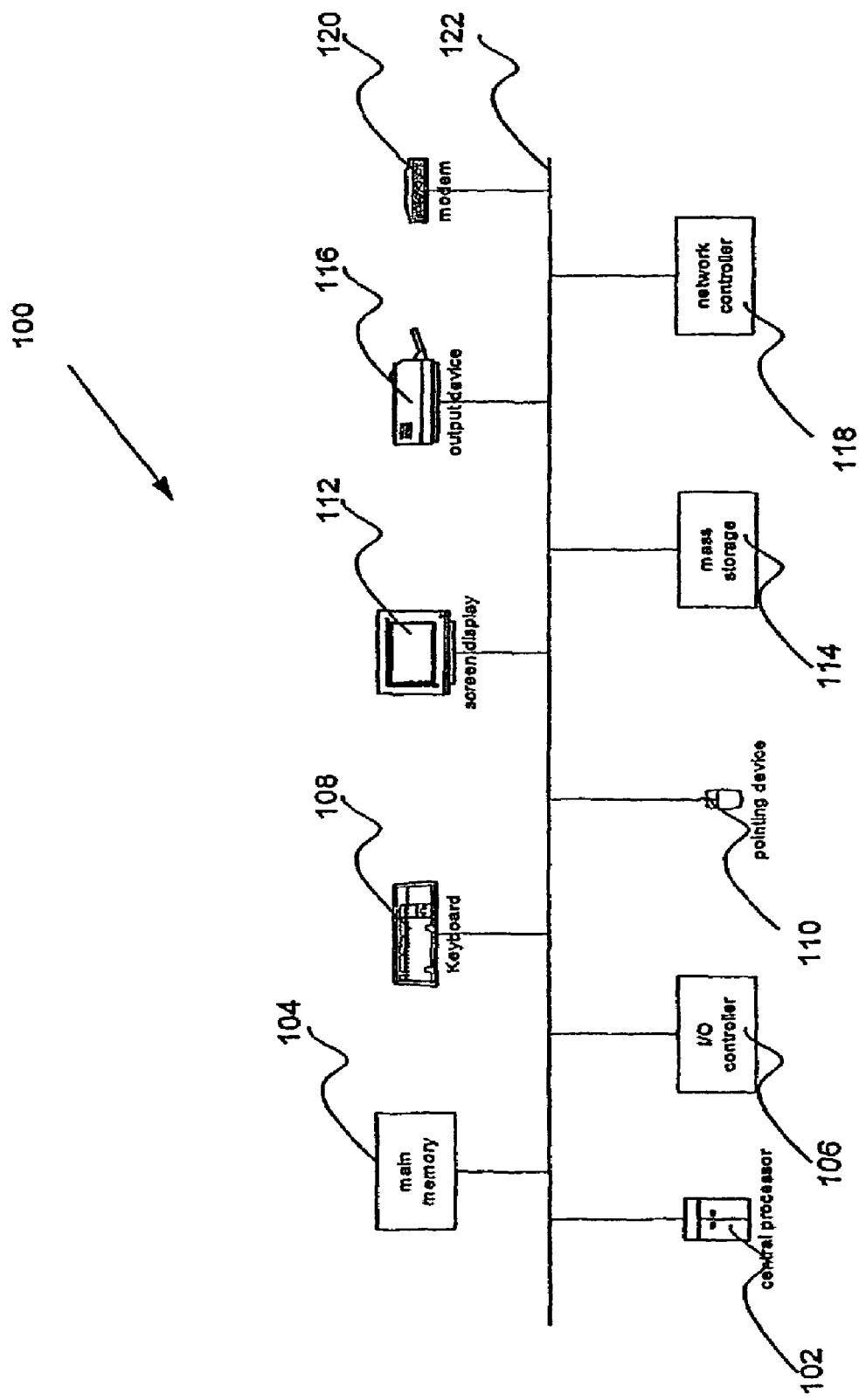
FIG. 2 shows the preferred system architecture of hardware on which the present invention may be implemented.

FIG. 2 shows the preferred system architecture of a client 20 or workstation 60. The computer system 100 typically comprises a central processor 102, a main memory 104 for example RAM and an input/output controller 106. The computer system 100 may also comprise peripherals such as a keyboard 108, a pointing device 110 for example a mouse, track ball or touch pad, a display or screen device 112, a mass storage memory 114 for example a hard disk, floppy disk or optical disc, and an output device 116 for example a printer. The system 100 could also include a network interface card or controller 118 and/or a modem 120. The individual components of the system 100 could communicate through a system bus 122.

Alternatively, the workstation 60 or client 20 could comprise any suitable data carrier or processor for example a handheld data processor and be arranged to communicate with for example the data repository 40 over any suitable network 30.

Figure 3:
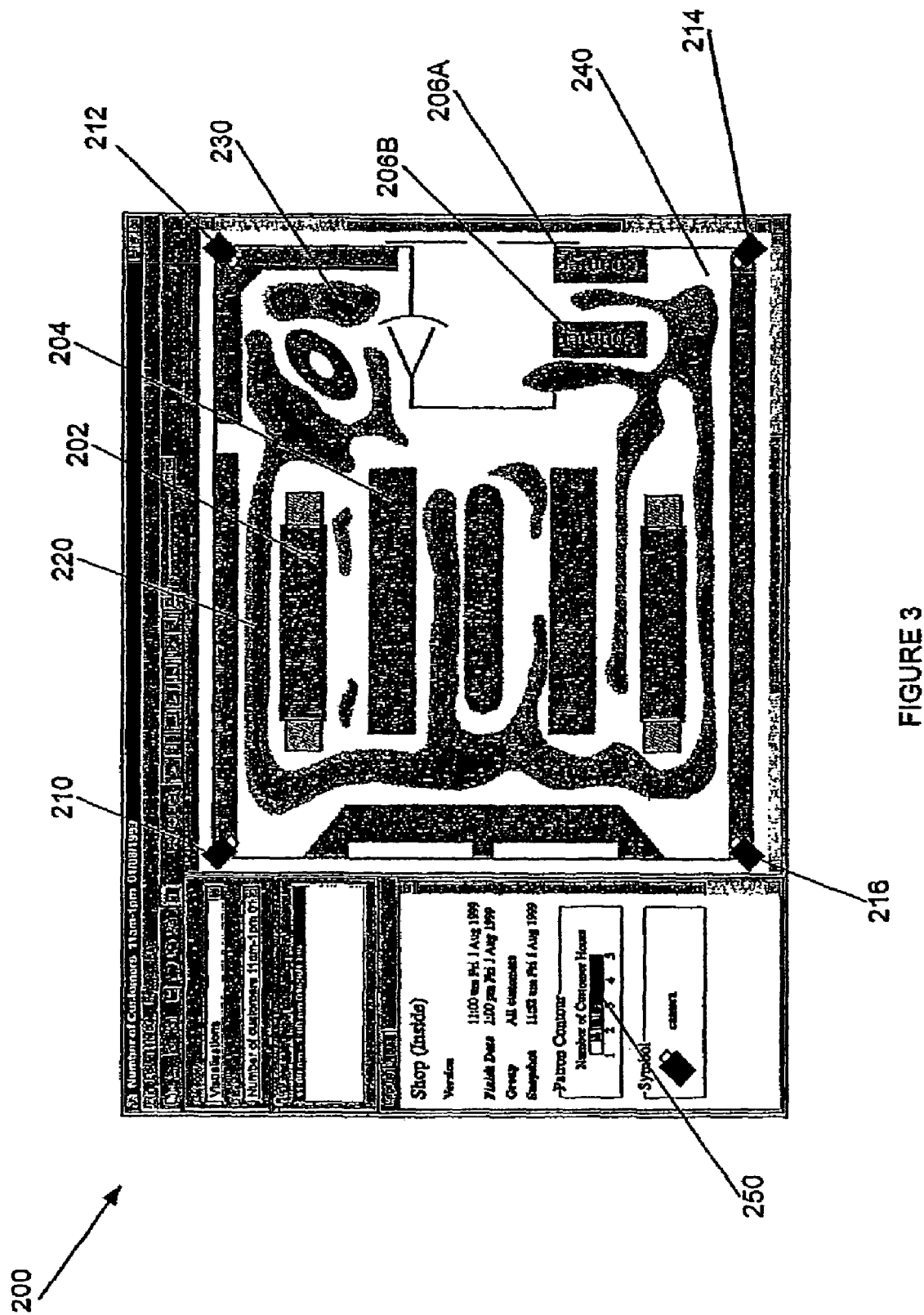
FIG. 3 is a preferred representation generated in accordance with the invention.

FIG. 3 illustrates at 200 one example of a display generated by the system where a merchant operates a retail premises. In this example, a graphical representation of the merchant is generated and displayed. The graphical representation could include a spatial representation of the premises of the merchant showing for example shelves 202 and 204 and counters 206A and 206B. It will be appreciated that the particular representation generated will be varied according to the nature of the data presented.

In the example shown in FIG. 3, a display is arranged to display a contoured representation of customer interest points within the retail premises. Video cameras 210, 212, 214 and 216 are positioned at a strategic position within the commercial premises. Video camera 214, for example, is arranged to capture images of customers waiting to be served at counters 206A and 206B. Images from the cameras 210, 212, 214 and 216 are preferably captured and stored in data repository 40, processed by the workstation 60 and displayed on the client 20 in the form shown in FIG. 3.

Superimposed on the merchant premises is a contoured representation 220 of a representation of the number of customers passing through monitored areas captured by video cameras 210, 212, 214 and 216. Such customer behaviour could include key performance indicators for example the number of customers passing through one area of the representation and could also include the length of time that individual customers spend in each area.

These key performance indicators are displayed as a contoured representation 220 in which areas of large customer traffic, for example 230, are indicated in a particular colour and areas of low customer traffic, for example 240, are indicated in a different colour, with a range of colours between the colours of points 230 and 240 showing different ranges of customer traffic. Preferably a legend is provided as indicated at 250 to indicate actual data values represented by the colours.

The areas of high customer traffic are preferably represented in a particular colour with areas around these high areas represented to gradually drop off or fall away from each point of high interest. Each data point could be represented by x and y coordinates indicating the relative position of each data point in the representation. Each data point could also have a z value representing the height or magnitude of the data point. This z value could indicate, for example, the length of time spent at a particular data point. Each data value is therefore centred on a data point.

The data value of the data point preferably represents the apex of a bell-shaped curve. As x and y values in the representation 200 are increased or decreased, the z value of the new position in the representation will change. Each data point has an axis and a maximum value at that axis. At a distance r from the axis, the drop in z value is preferably calculated by a drop-off function such as the following:

$$f(r) = \frac{1}{1 + \left(\frac{r}{a}\right)^p}$$

The value of p is preferably 2 or 3. As the value of p is increased, the data point is represented having a steeper shoulder and a flatter peak with steeper walls.

The value of a defines the horizontal distance between the axis and the point of maximum drop-off of the resulting curve, which in practice defines the width of the contoured "hill". The value of a could be, for example, the point of "half height" of the hill. Small values of a will result in fine detail in a contoured representation and larger values of a will result in a less detailed representation.

It is envisaged that there are shown a series of data points over the representation 200 and that values are contoured around these data points. Values of a are preferably chosen so that the contoured representation does not display any data values in the areas covered by for example shelves 202 and 204.

These KPI values could also be represented in a 3-dimensional coordinate system $(x_i, y_i, z_i)$, where $i=1 \ldots N$. N is the number of data points in the finite set which in this case will be the number of points through which customer traffic is measured. The (x,y,z) values represent a finite set of data points.

Each data point is spaced a certain distance from each other data point in the finite set. The distance between points i and j, for example, could be defined as:

$$(r_{ij})^2 = (x_i - x_j)^2 + (y_i - y_j)^2$$

where $r_{ij}$ is the distance between points i and j.

In some circumstances, the z values located around a particular data point will interfere with the z values calculated for neighbouring data points. The extent to which one data point will interfere with another data point can be represented as $m_{ij}$, being the height of hill j at point i. The correct value of each data point is already known, for example calculated from the data repository 40, and so it is necessary to calculate a corrective value t to ensure that the z value at each data point is correct.

The matrix equation M*T=Z is represented as follows:

$$\begin{bmatrix} f(r_{11}) & \ldots & f(r_{1N}) \\ \ldots & & \ldots \\ f(r_{N1}) & \ldots & f(r_{NN}) \end{bmatrix} \cdot \begin{bmatrix} t_1 \\ \ldots \\ t_N \end{bmatrix} = \begin{bmatrix} z_1 \\ \ldots \\ z_N \end{bmatrix}$$

Matrix M is an N by N matrix having individual values $M_{ij}=f(r_{ij})$. Matrix T is an N by 1 matrix of individual corrective values $t_{ij}$. Matrix Z is an N by 1 matrix of individual z values $z_i$.

The corrective $t_i$ values can be obtained using the known method of solving simultaneous linear equations. Once the corrective $t_i$ values are obtained, the remaining points on the surface to be represented can be calculated from the following equation:

$$F(x, y) = \sum \left\{ t_i * f\left(\sqrt{(x-x_i)^2 + (y-y_i)^2}\right), i = 1\ldots N \right\}$$

In this way, a curve or surface can be generated which passes through two or more known data points for the representation 200, generating values for neighbouring additional data points.

It is envisaged that the value calculated for an (x,y) position corresponding to a shelf, counter or other obstruction be a null value.

The display could be configured to present to a user on client 20 a series of images forming an animated visual image sequence which can be analysed at a later date. The invention could be arranged, for example, to present to a user the activity within a retail premises over a 2 hour period by presenting data captured by video cameras and stored in data repository 40 over this 2 hour period to a user. Individual images preferably include a time and/or date value to enable these data values to be displayed in sequential order.

It is envisaged that the invention could present to a user contoured representations similar to FIG. 3 of data values from any data set or plurality of data sets in the data repository 40, for example data sets obtained from visual input apparatus 42, audio input apparatus 44, traffic counting apparatus 46, pressure sensitive apparatus 48 and/or interaction data 50.

It is also envisaged that where a queue of physical objects for example people or cars are being monitored at a particular location, the attributes of the objects for example gender or ethnicity and the behaviour for example irritability, state of agitation or queue movement, could be recorded with a video camera in order to assess a particular queue for the required data. The invention is also capable of monitoring the movement of groups of people and identifying individuals that could be loitering in a particular area, either inside or outside a premises, and alert a user to this behaviour, who can then either monitor the individuals or approach them directly.

Contoured representations can be presented of any one or more key performance indicators for example the length of the queue, the average waiting time in the queue, the average service time, the queue falloff, any service points in a retail establishment, service point throughput, and demographic composition of a queue at any given time.

The invention could provide a user with a real time tool to optimise the number of service points, depending on the data displayed on the client 20. For example, if a customer had been waiting in the queue for more than two minutes, additional service points could immediately be opened or staffed.

Figure 4:
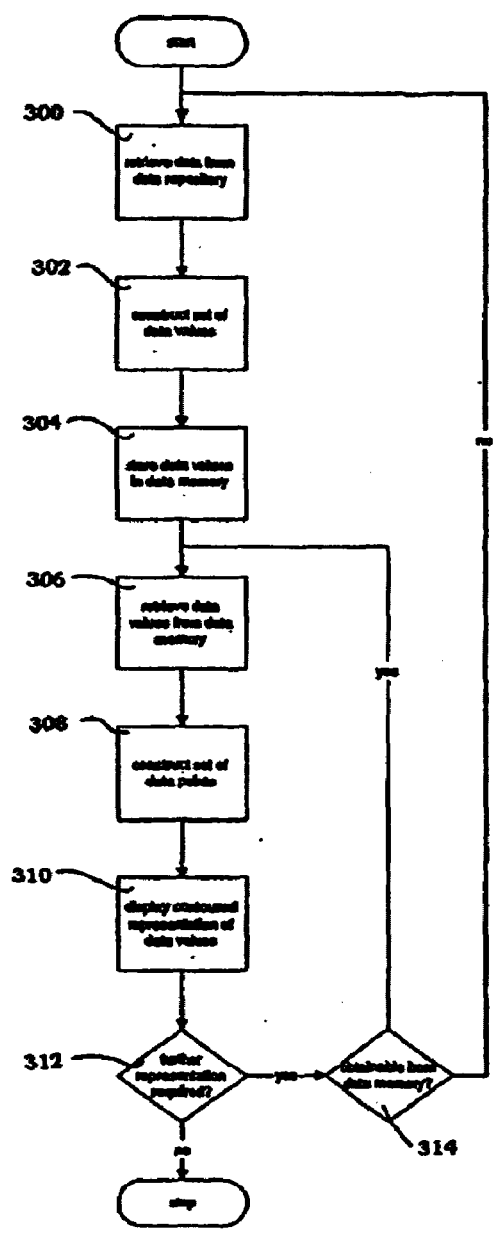
FIG. 4 is a flowchart of a preferred form of the invention.

FIG. 4 illustrates the preferred method of operation of the invention. As shown at 300, data is retrieved from the data repository 40 using a suitable query. The retrieved data could include data sourced from any one or more of the visual input apparatus 42, audio input apparatus 44, traffic counting apparatus 46, pressure sensitive apparatus 48 and interaction data 50.

As shown at 302, a set of data values is constructed from the retrieved data. This set of data values could include for example customer traffic through a merchant premises.

It is envisaged that the set of data values could optionally be stored in data memory 62 to increase efficiency of the system, as indicated at 304, which could comprise volatile main RAM or non-volatile mass storage of the workstation 60 on which the invention is implemented.

Referring to step 306, the set of data values is retrieved from the volatile or non-volatile data memory and as shown at 308, a set of data points is constructed to represent the data values. Appropriate x and y values are generated for each data point to space the data points over a generated representation.

Referring to step 310, a contoured representation of the data values is generated and displayed on a client 20. The individual drop-off for each data point is calculated and displayed in the appropriate colour and shading corresponding to the z value at each point.

It is envisaged that the invention generate individual displays of contoured representations. It is also envisaged that the invention generate animated sequences of representations by generating two or more "still" representations at various time intervals and superimposing successive representations over earlier representations to generate an animated sequence.

As indicated at 312, where such an animated sequence is required, further representations will be needed and if the necessary data is obtainable from the data memory as indicated at 314, it is retrieved from the data memory as indicated at 306, otherwise further data is retrieved from the data repository at 300.

It is envisaged that the invention could be used as a management tool to visually display the efficiency of each of these service points. In this way, a service point operator spending more than 10 minutes per customer could be identified as inefficient and appropriate action taken.

By viewing representations produced over a time period, a user would be able to recognise trends in a queue or crowd. For example, if more customers are using a merchant's services after 5.00 pm than during business hours, then the service provider could increase the number of service points operating during these times.

In a further preferred form, the invention could enable a user to monitor demographic makeup of a queue or crowd, prompting a service provider to alter advertising, security, services provided or marketing visual or audio advertising to the customer while in the queue or crowd or receiving a service.

The invention has the effect that merchants and other organisations are provided with an easily interpreted and intuitive representation of data which could be useful in identifying unexpected trends in the data.

The foregoing describes the invention including preferred forms thereof. Alterations and modifications as will be obvious to those skilled in the art are intended to be incorporated within the scope hereof, as defined by the accompanying claims.

The invention claimed is:

1. A data visualization system comprising:
   an interaction database maintained in computer memory of interaction data representing interactions between customers and merchants, the interaction data obtained from monitoring apparatus;
   a retrieval component configured to retrieve from the interaction database data representing interactions between customers and merchants and to construct a finite set of data values from the retrieved data;
   a display component configured to display a graphical representation of at least one merchant and a graphical representation of each of the set of data values centered on respective data points; and
   a contour generator configured to generate and display one or more contour lines at least partly around each data point or group of data points, each contour line representing data values that are less than the data value(s) of the data point(s) around which the contour line is displayed.

2. A data visualization system as claimed in claim 1 wherein at least some of the data values comprise a set of data values obtained from processing a series of images captured by monitoring apparatus in the form of visual input apparatus, each set of data values including a time and/or date value.

3. A data visualization system as claimed in claim 1 wherein at least some of the data values comprise a set of data values obtained from processing a series of segments of audio data captured by monitoring apparatus in the form of audio input apparatus, each set of data values including a time and/or date value.

4. A data visualization system as claimed in claim 1 wherein at least some of the data values comprise a set of data values obtained from monitoring apparatus in the form of traffic-counting apparatus, each set of data values including an integer representing traffic flow and a time and/or date value.

5. A data visualization system as claimed in claim 1 wherein at least some of the data values comprise a set of data values obtained from monitoring apparatus in the form of pressure-sensitive apparatus, each set of data values including a time and/or date value.

6. A data visualization system as claimed in claim 1 wherein at least some of the data values comprise a set of data values obtained from a telecommunications network, each set of data values representing the number of callers in a queue and a time and/or date value.

7. A method of data visualization comprising the steps of:
   maintaining in computer memory an interaction database of interaction data representing interactions between customers and merchants, the interaction data obtained from monitoring apparatus;
   retrieving from the interaction database data representing interactions between customers and merchants;
   constructing a finite set of data values from the retrieved data;
   displaying a graphical representation of at least one merchant;
   displaying a graphical representation of each of the set of data values centered on respective data points; and
   generating and displaying one or more contour lines at least partly around each data point or group of data points, each contour line representing data values that are less than the data value(s) of the data point(s) around which the contour line is displayed.

8. A method of data visualization as claimed in claim 7 further comprising the step of obtaining at least some of the data values from processing a series of images captured by monitoring apparatus in the form of visual input apparatus, each set of data values including a time and/or date value.

9. A method of data visualization as claimed in claim 7 further comprising the step of obtaining at least some of the data values from processing a series of segments of audio data captured by monitoring apparatus in the form of audio input apparatus, each set of data values including a time and/or date value.

10. A method of data visualization as claimed in claim 7 further comprising the step of obtaining at least some of the data values from monitoring apparatus in the form of traffic-counting apparatus, each set of data values including an integer representing traffic flow and a time and/or date value.

11. A method of data visualization as claimed in claim 7 further comprising the step of obtaining at least some of the data values from monitoring apparatus in the form of pressure-sensitive apparatus, each set of data values including a time and/or date value.

12. A method of data visualization as claimed in claim 7 further comprising the step of obtaining at least some of the data values from a telecommunications network, each set of data values representing the number of callers in a queue and a time and/or date value.

* * * * *